US012011961B2

(12) United States Patent
Jeong et al.

(10) Patent No.: US 12,011,961 B2
(45) Date of Patent: Jun. 18, 2024

(54) TOP MOUNT ASSEMBLY AND METHOD FOR MANUFACTURING SAME

(71) Applicant: ILJIN CO., LTD., Gyeongju-si (KR)

(72) Inventors: Se Woong Jeong, Ulsan (KR); Byung Hwan Kim, Busan (KR); Tae Ho Hong, Seoul (KR)

(73) Assignee: ILJIN CO., LTD., Gyeongju-si (KR)

( * ) Notice: Subject to any disclaimer, the term of this patent is extended or adjusted under 35 U.S.C. 154(b) by 60 days.

(21) Appl. No.: 17/611,618

(22) PCT Filed: May 18, 2020

(86) PCT No.: PCT/KR2020/006500
§ 371 (c)(1),
(2) Date: Jun. 24, 2022

(87) PCT Pub. No.: WO2020/235903
PCT Pub. Date: Nov. 26, 2020

(65) Prior Publication Data
US 2022/0332160 A1    Oct. 20, 2022

(30) Foreign Application Priority Data

May 17, 2019   (KR) ........................ 10-2019-0057802

(51) Int. Cl.
*B60G 15/06*   (2006.01)
(52) U.S. Cl.
CPC ...... *B60G 15/067* (2013.01); *B60G 2204/128* (2013.01); *B60G 2204/4104* (2013.01);
(Continued)

(58) Field of Classification Search
CPC .......... B60G 2206/73; B60G 2204/128; B60G 15/067
See application file for complete search history.

(56) References Cited

U.S. PATENT DOCUMENTS 7,314,224 B2 * 1/2008 Schuyten .................. F16F 9/54
                                                  280/86.752
9,545,830 B2 * 1/2017 Bedeau ..................... F16C 19/10
(Continued)

FOREIGN PATENT DOCUMENTS

FR    2778606 A1 * 11/1999    ........... B60G 15/068
FR    3117938 A1 *  6/2022
(Continued)

OTHER PUBLICATIONS

International Search Report of PCT/KR2020/006500 dated Aug. 26, 2020.

*Primary Examiner* — Amy R Weisberg
*Assistant Examiner* — Maxwell L Meshaka
(74) *Attorney, Agent, or Firm* — Dinsmore & Shohl LLP; Yongsok Choi, Esq.

(57) ABSTRACT

A top mount assembly includes an insulator comprising an upper plate, a lower plate, and a rubber bushing accommodated in an accommodation space defined between the upper plate and the lower plate; and a strut bearing comprising an upper housing, a lower housing, and a bearing interposed between the upper housing and the lower housing and configured to rotate the lower housing relative to the upper housing. The upper housing of the strut bearing may comprise an insulator mounting part formed on an upper portion of the upper housing and on which the insulator is mounted, the insulator mounting part may comprise a lower plate mounting part on which the lower plate of the insulator is mounted and an upper plate supporting part formed outside the lower plate mounting part, and the upper plate support part may be configured to support a lower surface of the upper plate.

11 Claims, 11 Drawing Sheets

(52) U.S. Cl.
CPC .... *B60G 2204/418* (2013.01); *B60G 2206/73* (2013.01); *B60G 2206/81012* (2013.01); *B60G 2206/8207* (2013.01); *B60G 2206/82092* (2013.01)

(56) References Cited

U.S. PATENT DOCUMENTS

| | | | |
|---|---|---|---|
| 10,166,829 B2* | 1/2019 | Hubert | F16C 19/16 |
| 10,518,598 B1* | 12/2019 | Shaikh | F16C 33/7853 |
| 10,655,703 B2* | 5/2020 | Akiyama | F16F 9/54 |
| 11,046,139 B2* | 6/2021 | Hubert | F16C 27/08 |
| 2006/0049592 A1* | 3/2006 | Schuyten | B60G 15/067 |
| | | | 280/86.75 |
| 2016/0089946 A1* | 3/2016 | Bedeau | F16C 19/10 |
| | | | 248/634 |
| 2017/0158012 A1* | 6/2017 | Hubert | B60G 7/02 |
| 2019/0105956 A1* | 4/2019 | Hubert | B60G 7/02 |
| 2019/0186585 A1* | 6/2019 | Akiyama | F16F 1/3835 |
| 2020/0164708 A1* | 5/2020 | Lim | B60G 15/068 |
| 2020/0406515 A1* | 12/2020 | Lim | B60G 15/04 |
| 2021/0107327 A1* | 4/2021 | Blanchard | B60G 15/068 |
| 2023/0056209 A1* | 2/2023 | Oh | B60G 15/067 |

FOREIGN PATENT DOCUMENTS

| | | | |
|---|---|---|---|
| JP | H08100831 A | | 4/1996 |
| JP | 2002031180 A | | 1/2002 |
| JP | 2008106867 A | | 5/2008 |
| KR | 1020170025879 A | | 3/2017 |
| KR | 1020180121232 A | | 11/2018 |
| KR | 102111282 B1 | * | 6/2020 |
| KR | 20220039294 A | * | 3/2022 |
| KR | 102385444 B1 | * | 6/2022 |

* cited by examiner

TOP MOUNT ASSEMBLY AND METHOD FOR MANUFACTURING SAME

CROSS-REFERENCE TO RELATED APPLICATION

This application is a national phase of International Application No. PCT/KR2020/006500 filed on May 18, 2020, which claims priority to Korean Patent Application No. 10-2019-0057802 filed on May 17, 2019, the entire contents of which are herein incorporated by reference.

TECHNICAL FIELD

The present disclosure relates to a top mount assembly for a vehicle and a manufacturing method therefor. [The present disclosure has been derived from research conducted as Futuristic Vehicle Leading Technology Development Project of Korea Automotive Technology Institute [Project Number: DG-2017-04, Research Subject Name: Development of low-torque light-weight strut bearing integral top mount assembly]

BACKGROUND ART

A suspension system of a vehicle is a system which supports a weight of a vehicle body, reduces a vertical vibration of a wheel to improve ride comfort, prevents damage to a cargo due to an impact, and prevents an excessive load from acting on each part. A front suspension system of an individual suspension type includes a wishbone-type suspension system and a McPherson-type suspension system. The McPherson type suspension system has been widely used in a passenger car due to a simplified structure and low cost as compared to the wishbone type suspension system.

A strut having a shock absorber embedded therein and a coil spring provided outside is used in the McPherson type suspension system. An upper end of the strut is coupled to a vehicle body through a top mount assembly and a lower end thereof is coupled to a knuckle. The strut is configured to be rotated relative to the vehicle body according to steering of a wheel.

The top mount assembly may comprise an insulator and a strut bearing fitted to the insulator. The insulator may comprise an upper plate, a lower plate, and a rubber bushing disposed between the upper plate and the lower plate. The strut bearing may comprise an upper housing, a lower housing, and a bearing disposed between the upper housing and the lower housing.

Since the top mount assembly in the related art is configured such that the strut bearing is fitted to the insulator, foreign substances may flow between the upper housing of the strut bearing and the insulator. Due to the foreign substances flowing between the upper housing and the insulator, the insulator and the strut bearing may be spaced apart from each other, and the insulator and/or the strut bearing may be damaged.

Technical Problem

The present disclosure was made for the purpose of solving the above matters related to the top mount assembly in the related art, and the present disclosure is for the purpose of providing a top mount assembly configured such that an upper housing of a strut bearing is formed to be coupled integrally with an insulator, and thus the strut bearing and the insulator are firmly coupled to each other, and a method of manufacturing the same.

Technical Solution

Representative configurations of the present disclosure to achieve the above purposes are described below.

According to an embodiment of the present disclosure, there is provided a top mount assembly for a vehicle. The top mount assembly according to an embodiment of the present disclosure may comprise: an insulator comprising an upper plate, a lower plate, and a rubber bushing accommodated in an accommodation space defined between the upper plate and the lower plate; and a strut bearing comprising an upper housing, a lower housing, and a bearing interposed between the upper housing and the lower housing and configured to rotate the lower housing relative to the upper housing. According to an embodiment of the present disclosure, the upper housing of the strut bearing may comprise an insulator mounting part formed on an upper portion of the upper housing and on which the insulator is mounted, the insulator mounting part may comprise a lower plate mounting part on which the lower plate of the insulator is mounted and an upper plate supporting part formed outside the lower plate mounting part, and the upper plate support part may be configured to support a lower surface of the upper plate, which protrude more outward than the lower plate, from below.

According to an embodiment of the present disclosure, an outer peripheral surface of the upper plate supporting part may be formed to be equal in size to an outer peripheral surface of the upper plate, or to be larger than the outer peripheral surface of the upper plate, so that the outer peripheral surface of the upper plate is formed so as not to protrude more outward than the upper plate supporting part.

According to an embodiment of the present disclosure, the upper housing of the strut bearing may be formed to be coupled integrally with the lower plate of the insulator by an insert injection molding.

According to an embodiment of the present disclosure, the lower plate of the insulator may comprise at least one holding part used for coupling with the upper housing of the strut bearing.

According to an embodiment of the present disclosure, the holding part may comprise a through-hole formed to penetrate the lower plate and an accommodation recess formed in an upper portion of the through-hole and having a size larger than the through-hole.

According to an embodiment of the present disclosure, the holding part may comprise a plurality of holding parts provided along a circumferential direction of the lower plate.

According to an embodiment of the present disclosure, the insulator mounting part may further comprise a coupling flange formed and accommodated in the accommodation recess of the holding part.

According to an embodiment of the present disclosure, the upper housing of the strut bearing may be formed by an insert injection molding in a state in which the upper plate and the lower plate of the insulator are coupled such that a rubber bushing is accommodated between the upper plate and the lower plate of the insulator, so that the upper housing of the strut bearing is coupled integrally with the lower plate of the insulator.

According to an embodiment of the present disclosure, the upper plate and the lower plate of the insulator are coupled to each other by mounting one or more fastening bolts into bolt fastening holes, respectively, and the fastening bolts may be mounted into the bolt fastening holes formed in the lower plate and the upper plate from a lower side of the lower plate in a press-fitting manner.

According to an embodiment of the present disclosure, the upper housing of the strut bearing may be formed to enclose the fastening bolts protruding toward the lower side of the lower plate.

According to an embodiment of the present disclosure, the upper housing of the strut bearing may further comprise a body part having a plurality of ribs formed to extend radially on one side of the insulator mounting part.

According to an embodiment of the present disclosure, a lower surface of the upper housing may comprise a recess part having an upwardly-depressed structure.

According to an embodiment of the present disclosure, there is provided a top mount assembly for a vehicle. The top mount assembly according to an embodiment of the present disclosure may comprise: an insulator comprising an upper plate, a lower plate, and a rubber bushing accommodated in an accommodation space defined between the upper plate and the lower plate; and a strut bearing comprising an upper housing, a lower housing, and a bearing interposed between the upper housing and the lower housing and configured to rotate the lower housing relative to the upper housing. According to an embodiment of the present disclosure, the upper housing of the strut bearing may comprise an insulator mounting part formed on an upper portion of the upper housing and on which the insulator is mounted, and a lower surface of the upper housing may comprise a recess part having an upwardly-depressed structure.

According to an embodiment of the present disclosure, the recess part formed on the lower surface of the upper housing may comprise one or more reinforcing ribs formed to extend between a radial inner surface and a radial outer surface of the recess part along a circumferential direction.

According to an embodiment of the present disclosure, there is provided a method of manufacturing a top mount assembly. The method according to an embodiment of the present disclosure may comprise: a lower plate forming operation of preparing a lower plate of an insulator; a fastening bolt coupling operation of coupling one or more fastening bolts to the lower plate of the insulator; a rubber bushing arrangement operation of arranging a rubber bushing on the lower plate of the insulator; an upper plate coupling operation of coupling the upper plate of the insulator to the lower plate and the fastening bolts; an upper housing forming operation of forming an upper housing of a strut bearing below the insulator; a lower housing preparation operation of preparing a lower housing of the strut bearing; a bearing arrangement operation of arranging a bearing on the lower housing of the strut bearing; an upper-housing and lower-housing coupling operation of coupling the lower housing to the upper housing of the strut bearing in a state in which the bearing is interposed between the upper housing and the lower housing.

According to an embodiment of the present disclosure, the upper housing formed in the upper housing forming operation may comprise an insulator mounting part formed on an upper portion of the upper housing and on which the insulator is mounted, the insulator mounting part may comprise a lower plate mounting part on which the lower plate of the insulator is mounted and an upper plate supporting part formed outside the lower plate mounting part, and the upper plate support part may be configured to support a lower surface of the upper plate, which protrude more outward than the lower plate, from below.

According to an embodiment of the present disclosure, an outer peripheral surface of the upper plate supporting part may be formed to be equal in size to an outer peripheral surface of the upper plate, or to be larger than the outer peripheral surface of the upper plate, so that the outer peripheral surface of the upper plate is formed so as not to protrude more outward than the upper plate supporting part.

According to an embodiment of the present disclosure, the lower plate formed in the lower plate forming operation may comprise at least one holding part used for coupling with the upper housing of the strut bearing.

According to an embodiment of the present disclosure, the holding part may comprise a through-hole formed to penetrate the lower plate, and an accommodation recess formed in an upper portion of the through-hole and having a size larger than the through-hole.

According to an embodiment of the present disclosure, the upper housing may comprise at least one coupling flange formed by injecting a plastic melt into the accommodation recess of the holding part formed in the lower plate of the insulator.

According to an embodiment of the present disclosure, in the upper housing forming operation, the upper housing may be formed using an insert injection molding by injecting the plastic melt into a mold in a state in which the insulator is fixed to the mold.

According to an embodiment of the present disclosure, the upper housing formed in the upper housing forming operation may comprise a recess part formed in a lower surface of the upper housing and having an upwardly-depressed structure.

According to an embodiment of the present disclosure, the recess part formed in the lower surface of the upper housing may comprise one or more reinforcing ribs formed to extend between a radial inner surface and a radial outer surface of the recess part along a circumferential direction.

Further, the top mount assembly and the manufacturing method therefor according to the present disclosure may further comprise other additional configurations without departing from the technical sprit of the present disclosure.

Advantageous Effects

A top mount assembly according to an embodiment of the present disclosure is configured such that an upper housing of a strut bearing is formed to be coupled integrally with a lower plate of an insulator by insert injection molding. This makes it possible to stably prevent foreign matters from entering between the strut bearing and the insulator, thus preventing the strut bearing and the insulator from being spaced apart from each other or from being damaged.

Furthermore, a top mount assembly according to an embodiment of the present disclosure is configured such that both a lower plate and an upper plate of an insulator are supported by and mounted on an upper housing of a strut bearing. This makes it possible to manufacture the top mount assembly in a more stable structure and high rigidity.

Furthermore, a top mount assembly according to an embodiment of the present disclosure is configured such that when an upper housing of a strut bearing is formed by insert-injection, a coupling flange is formed by filling molten plastic used as a material of an upper housing into a holding part formed in a lower plate of an insulator. Thus, the upper housing of the insulator and the strut bearing are more firmly coupled to each other. This makes it possible to more effectively prevent the upper housing from being spaced apart from or separated from the insulator.

Furthermore, a top mount assembly according to an embodiment of the present disclosure is configured such that a recess part (material reduction part) having a depressed structure is formed on a lower surface of an upper housing. Thus, when the upper housing of a strut bearing is formed by insert-injection, it is possible to prevent a problem from occurring in dimensional stability of the upper housing by twisting due to shrinkage of an injection-molded material. Further, the recess part is provided with one or more reinforcing ribs along a circumferential direction, which making it possible to prevent a degradation in rigidity due to the formation of the recess part.

EXPLANATION OF REFERENCE NUMERALS

Figure 1:
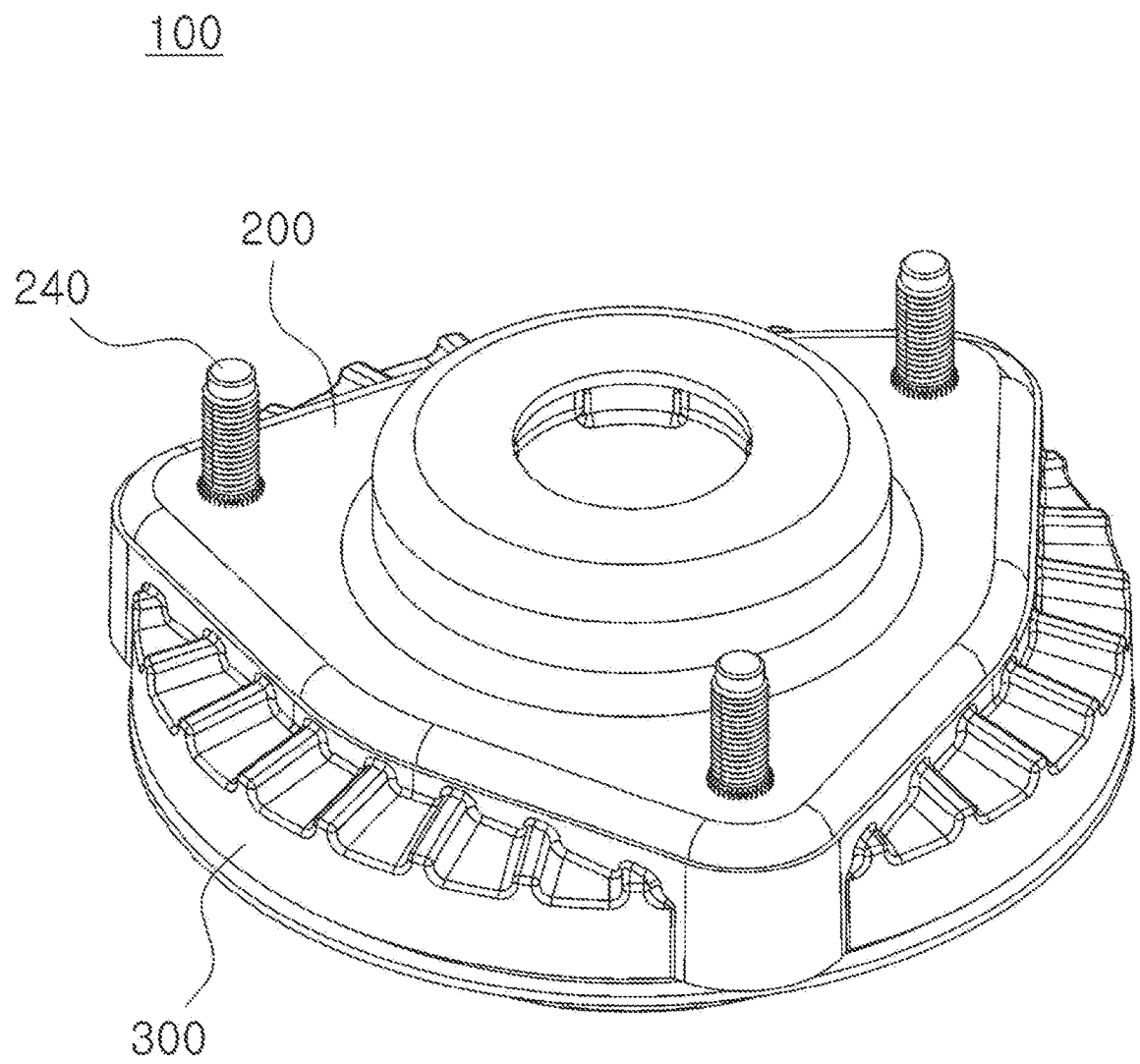
FIG. 1 exemplarily illustrates the overall structure of a top mount assembly according to an embodiment of the present disclosure.
Figure 2:
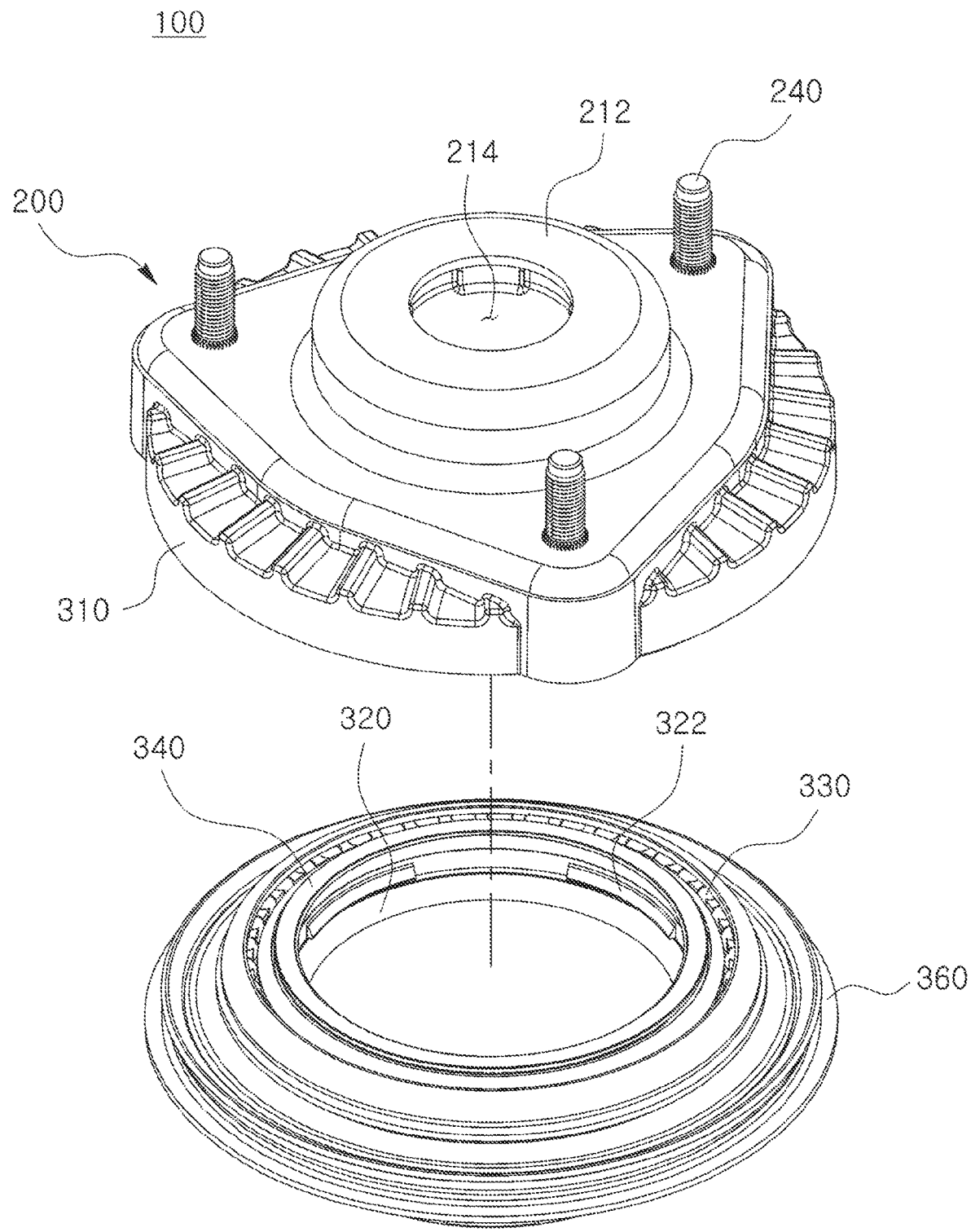
FIG. 2 exemplarily illustrates an exploded perspective view of the top mount assembly according to an embodiment of the present disclosure.

100: top mount assembly
200: insulator
210: upper plate
212: first bushing accommodation part
214: upper opening portion
216: first bolt fastening hole
220: lower plate
222: second bushing accommodation part
224: lower opening portion
226: second bolt fastening hole
228: holding part
228a: through-hole
228b: accommodation recess
230: rubber bushing
232: upper protrusion
234: lower protrusion
236: bushing case
238: core member
238a: through-opening portion (of core member)
240: fastening bolt
300: strut bearing
310: upper housing
311: insulator mounting part
311a: lower plate mounting part
311b: upper plate supporting part
312: body part (rib part)
312a: rib
313: coupling flange
314: recess part
315: reinforcing rib
316: upper hook
317: sealing groove
320: lower housing
322: lower hook
324: bearing seat
330: bearing
332: inner ring
334: outer ring
336: rolling element
338: retainer
340: inner sealing member
342: frame part
344: elastic sealing part
346: sealing lip
350: spring pad frame
360: spring pad
362: seat part
364: outer sealing lip
400: strut
410: strut bolt
420: strut nut
430: spring

MODES OF THE DISCLOSURE

Hereinafter, example embodiments of the present disclosure will be described in detail with reference to the accompanying drawings at such an extent that they may be readily practiced by those ordinary skilled in the art.

In order to clearly describe the present disclosure, detailed descriptions of parts irrelevant to the present disclosure will be omitted, and the same reference numerals will be given to the same constituent elements throughout the specification. Further, a shape and size of each constituent element illustrated in the drawings are arbitrarily illustrated for the sake of convenience in description, and hence the present disclosure is not necessarily limited to the shape and size illustrated. That is, it is to be understood that specific shapes, structures, and characteristics described herein may be modified from an embodiment to another embodiment without departing from the spirit and scope of the present disclosure. Positions or arrangements of individual constituent elements may also be modified without departing from the spirit and scope of the present disclosure. Therefore, the detailed description described below is not to be taken in a limiting sense, and the scope of the present disclosure is to be taken as covering the scope claimed by the appended claims and their equivalents.

For reference, the term "axial direction" used herein may be defined as a direction along a central axis of a top mount assembly, the term "radial direction" used herein may be defined as a direction perpendicular to the axial direction, the term "radially outward direction" may be defined as a direction perpendicular to and away from the central axis of the top mount assembly, and the term "radially inward direction" may be defined as a direction opposite to the radially outward direction (namely, a direction perpendicular to and toward the central axis of the top mount assembly).

Top Mount Assembly According to an Embodiment of Present Disclosure

Referring to FIGS. 1 to 11, a top mount assembly according to an embodiment of the present disclosure is exemplarily illustrated. As illustrated in the drawings, a top mount assembly 100 according to an embodiment of the present disclosure may be configured with an insulator 200 and a strut bearing 300 similar to a mount assembly in the related art, and may be mounted between a vehicle body and a strut to perform a function of reducing the transfer of impact or vibration between the strut and the vehicle body.

According to an embodiment of the present disclosure, the insulator 200 of the top mount assembly 100 may comprise an upper plate 210, a lower plate 220, a rubber bushing 230 provided between the upper plate 210 and the lower plate 220, and the like.

According to an embodiment of the present disclosure, the upper plate 210 of the insulator 200 may be formed to have a plate-like structure whose central portion protrudes upward, and may comprise a first bushing accommodation part 212 for accommodating a rubber bushing 230 in the protruded central portion. The upper plate 210 may be formed by pressing or punching a metal plate.

Figure 4:
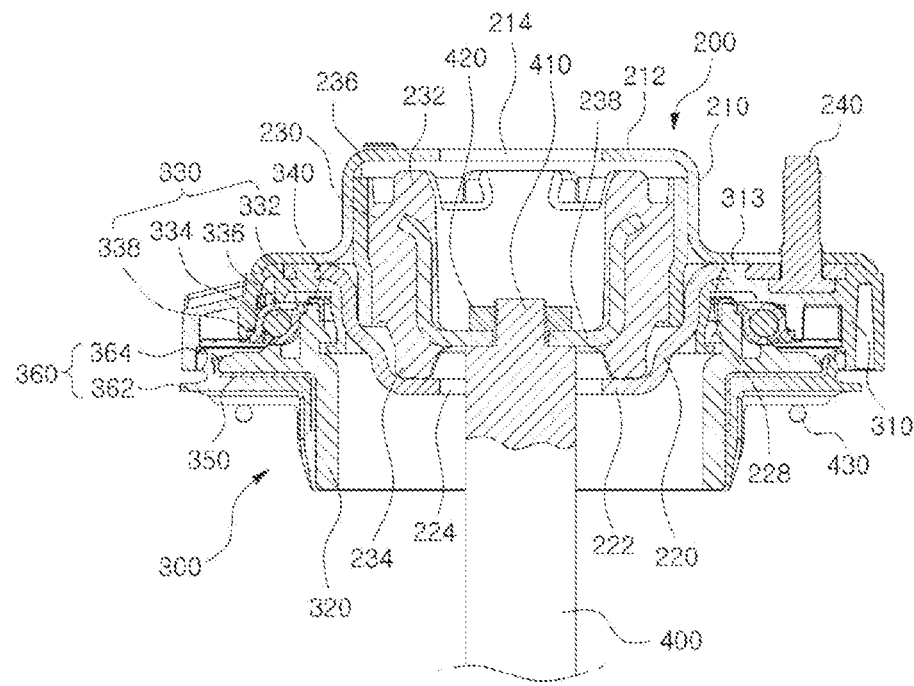
FIG. 4 exemplarily illustrates a state in which a strut is mounted to the top mount assembly illustrated in FIG. 3.

According to an embodiment of the present disclosure, the central portion of the first bushing accommodation part 212 may have a through-opening portion (upper opening portion 214). A tool may be inserted into the upper opening portion 214 when fastening a strut 400 to the top mount assembly 100 as illustrated in FIG. 4.

According to an embodiment of the present disclosure, the upper plate 210 of the insulator 200 may have bolt fastening holes (first bolt fastening holes 216) formed at radially outward portions of the first bushing accommodation part 212. When the upper plate 210 is coupled to the lower plate 220 (to be described later), fastening bolts 240 are inserted into the respective bolt fastening holes (the first bolt fastening holes 216).

According to an embodiment of the present disclosure, a plurality of bolt fastening holes (first bolt fastening holes 216) may be formed in the upper plate 210 along a circumferential direction. For example, the upper plate 210 may be formed in a substantially triangular outer shape as a whole when viewed in the axial direction. The bolt fastening holes (the first bolt fastening holes 216) may be formed near each apex of the triangular shape.

According to an embodiment of the present disclosure, the lower plate 220 of the insulator 200 may be formed to have a structure similar to that of the upper plate 210 described above. For example, the lower plate 220 may be formed to have a plate-like structure whose central portion protrudes downward, and may comprise a second bushing accommodation part 222 for accommodating the rubber bushing 230 in the protruded central portion. The lower plate 220 may be formed by pressing or punching a metal plate.

According to an embodiment of the present disclosure, the central portion of the second bushing accommodation part 222 may have a through-opening portion (lower opening portion 224). The strut 400 may be inserted into the lower opening portion 224 when fastening the strut 400 to the top mount assembly 100 as illustrated in FIG. 4.

According to an embodiment of the present disclosure, the upper plate 210 of the insulator 200 may have bolt fastening holes (second bolt fastening holes 226) formed at radially outward portions of the second bushing accommodation part 222. When the upper plate 210 is coupled to the lower plate 220, fastening bolts 240 are inserted into the respective bolt fastening holes (the second bolt fastening holes 226).

According to an embodiment of the present disclosure, the bolt fastening holes (the second bolt fastening holes 226) formed in the lower plate 220 may be formed at positions corresponding to the bolt fastening holes (the first bolt fastening holes 216) of the upper plate 210 such that the upper plate 210 and the lower plate 220 of the insulator 200 are coupled to each other. A plurality of bolt fastening holes (the second bolt fastening holes 226) may be formed in the lower plate 220 along a circumferential direction. For example, the lower plate 220 may be formed in a substantially triangular outer shape as a whole when viewed in the axial direction. The bolt fastening holes (the second bolt fastening holes 226) may be formed near each apex of the triangular shape.

Figure 3:
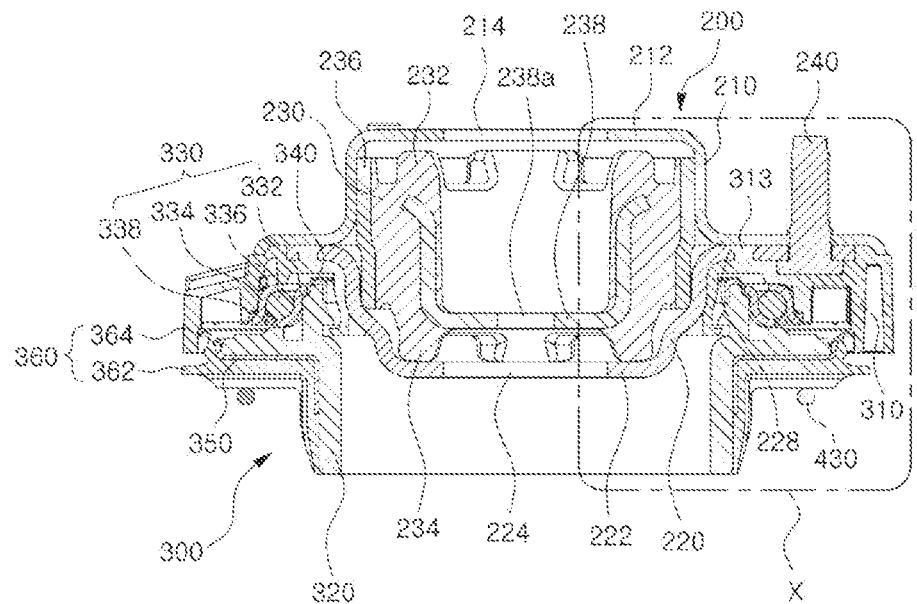
FIG. 3 exemplarily illustrates a cross-sectional structure of the top mount assembly according to an embodiment of the present disclosure.
Figure 5:
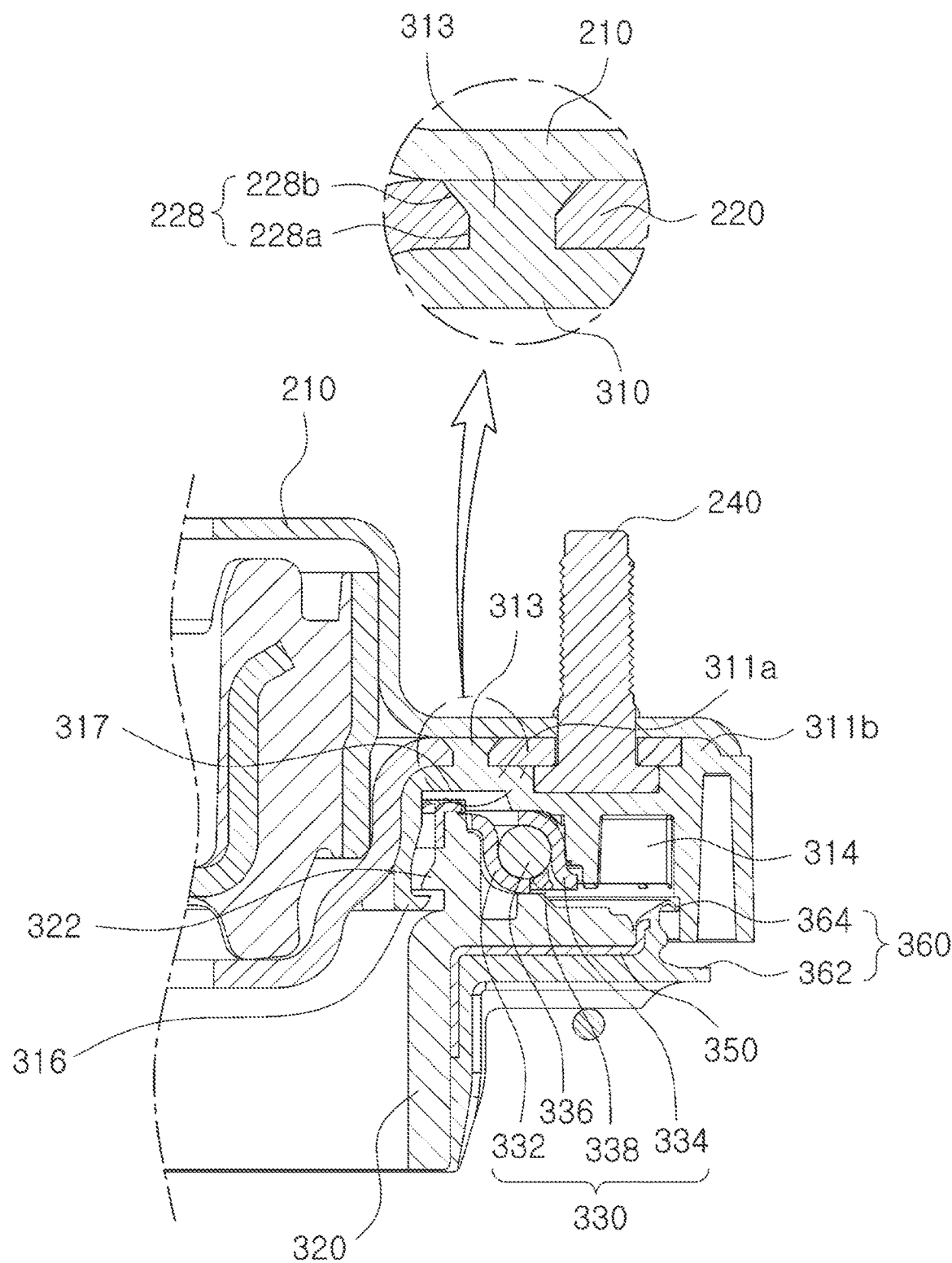
FIG. 5 illustrates an enlarged view of a portion X in FIG. 3.
Figure 6:
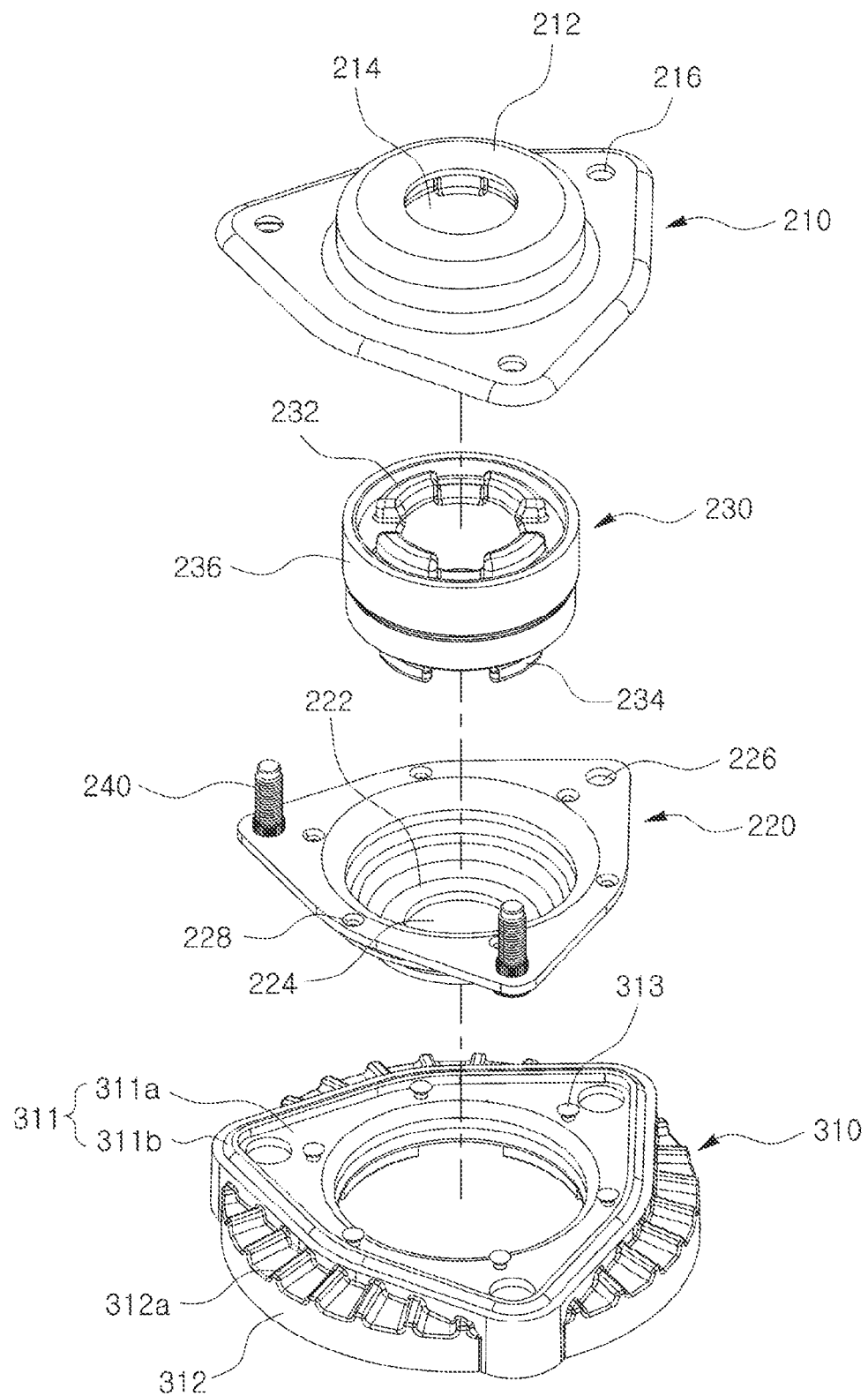
FIG. 6 exemplarily illustrates an exploded perspective view of an insulator and an upper housing of a strut bearing provided in the top mount assembly according to an embodiment of the present disclosure.

According to an embodiment of the present disclosure, the lower plate 220 may be coupled to the upper plate 210 such that an outer peripheral surface of the lower plate 220 is covered by the upper plate 210. For example, as illustrated in FIGS. 3 to 5, the lower plate 220 may be formed to be smaller than the upper plate 210 such that the outer peripheral surface of the lower plate 220 is located inward of the outer peripheral surface of the upper plate 210, that is, the outer peripheral surface of the upper plate 210 protrudes outward of the outer peripheral surface of the lower plate 220 so as to cover the lower plate 220 from the above.

According to an embodiment of the present disclosure, the lower plate 220 may comprise one or more holding parts 228 provided therein along the circumferential direction in the radially outward direction of the second bushing accommodation part 222. According to an embodiment of the present disclosure, as illustrated in FIGS. 3 to 6, each holding part 228 may have a through-hole 228a penetrating through the lower plate 220 and an accommodation recess 228b formed in an upper portion of the through-hole 228a and having a larger size than the through-hole 228a. For example, as illustrated in FIGS. 3 to 5, the accommodation recess 228b can be formed in a truncated cone shape having an upward-increased diameter.

With the holding parts 228 configured as above, when an upper housing 310 of the strut bearing 300 is formed below the insulator 200 by insert injection molding or the like, which will be described later, molten plastic used as a material of the upper housing 310 is allowed to flow into the accommodation recesses 228b via the through-holes 228a of the holding parts 228 and be filled in the accommodation recess 228b. Subsequently, the molten plastic filled in the accommodation recess 228b is solidified to form a coupling flange 313 that functions to improve a coupling force between the insulator 200 and the upper housing 310 of the strut bearing 300. Thus, the upper housing 310 of the strut bearing 300 is more firmly coupled to the lower plate 220 of the insulator 200 by the holding parts 228 and the coupling flange 313. This enables the upper housing 310 to be more firmly coupled to the lower plate 220 of the insulator 200 without being spaced apart from or separated from the lower plate 220.

According to an embodiment of the present disclosure, the rubber bushing 230 may be disposed and mounted in an accommodation space defined by the first bushing accommodation part 212 of the upper plate 210 and the second bushing accommodation part 222 of the lower plate 220 when the upper plate 210 and the lower plate 220 are coupled to each other, and may perform a function of absorbing impact to be transferred from the strut 400 and reducing shock and vibration to be transferred to the vehicle body.

According to an embodiment of the present disclosure, as illustrated in FIGS. 3 to 6, the rubber bushing 230 may be formed of an elastic body having a hollow cylindrical shape as a whole. The rubber bushing 230 may comprise an upper protrusion 232 formed in an upper portion thereof to extend upward in the axial direction, and a lower protrusion 234 formed in a lower portion thereof to extend downward in the axial direction. According to an embodiment of the present disclosure, a plurality of protrusions (a plurality of upper protrusions 232 and a plurality of lower protrusions 234) may be formed in the upper and lower portions of the rubber bushing 230 to be spaced apart from each other along the circumferential direction. In the case in which the protrusions are formed in this manner, when impact is applied to the rubber bushing 230, the rubber bushing 230 may be expanded or deformed into spaces between the protrusions, thus absorbing the impact in a more efficient manner.

Figure 7:
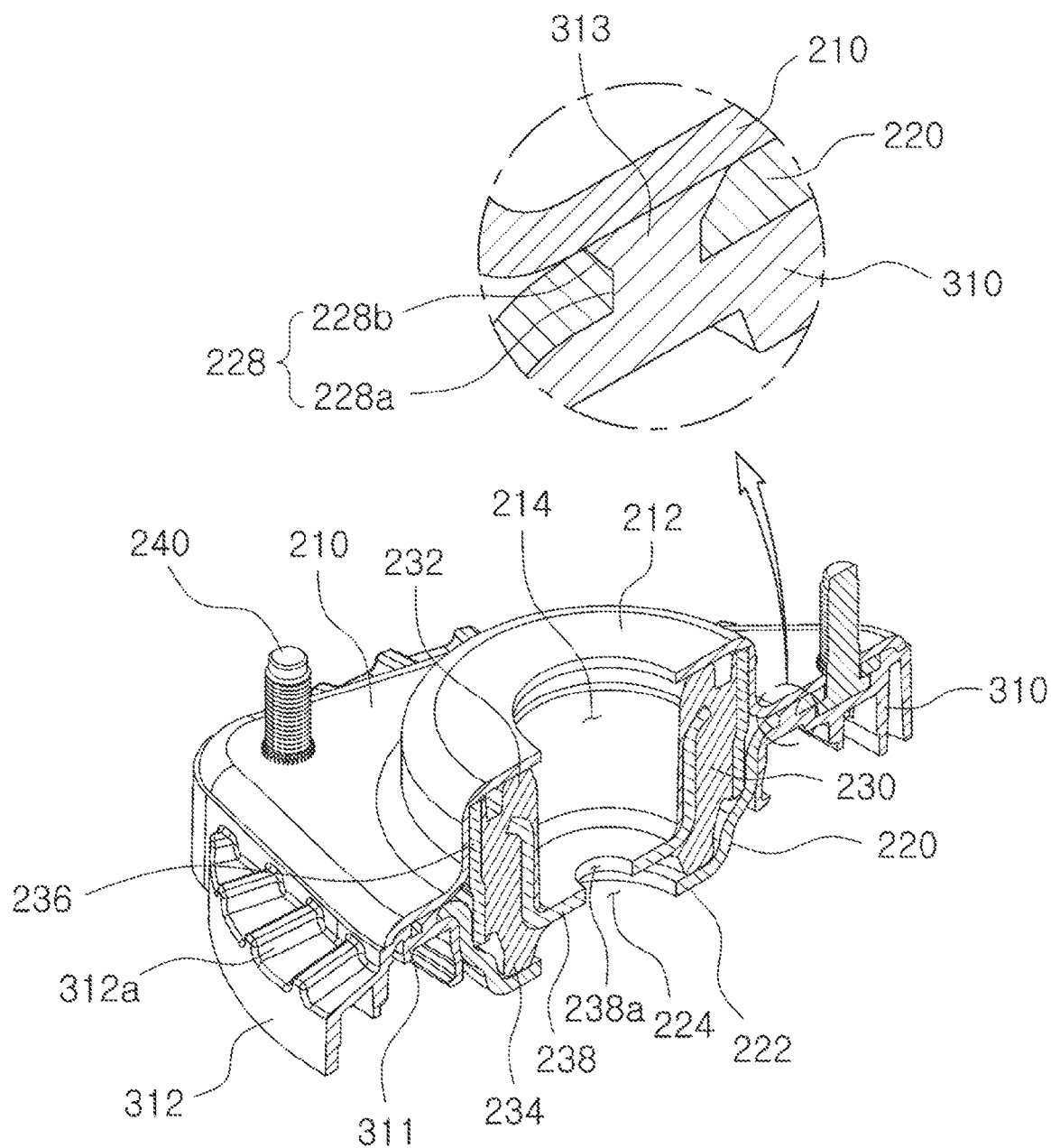
FIG. 7 exemplarily illustrates a cross-sectional structure in which the upper housing of the strut bearing is formed integrally with the insulator according to an embodiment of the present disclosure.

According to an embodiment of the present disclosure, a bushing case 236 may be provided on the outer peripheral surface of the rubber bushing 230. A core member 238 may be provided inside the rubber bushing 230. The core member 238 may be formed of a plate-like metal member. As illustrated in FIGS. 3, 4, and 7, the core member 238 may be formed in a cylindrical shape or a disc shape. The core member 238 may be configured to have a through-opening 238a formed in the central portion thereof.

According to an embodiment of the present disclosure, the core member 238 may be configured such that the central portion where the through-opening 238a is formed is disposed adjacent to the lower protrusions 234 of the rubber bushing 230. Further, the core member 238 may be configured such that the strut 400 is more stably mounted on and supported by the top mount assembly 100 by minimizing the size of the rubber bushing 230 interposed between the core member 238 and the strut 400.

According to an embodiment of the present disclosure, when the strut 400 is mounted on the top mount assembly 100, a strut bolt 410 provided on the upper portion of the strut 400 may be inserted into the through-opening 238a formed in the central portion of the core member 238 and the nut 420 may be fastened to the strut bolt 410 on the upper surface of the core member 238. The rubber bushing 230 may be formed integrally with the core member 238 by sulfurizing mold or the like in a state in which the core member 238 is fixed to a mold.

According to an embodiment of the present disclosure, the insulator 200 may be formed by coupling the upper plate 210 and the lower plate 220 in the state in which the rubber bushing 230 is accommodated in the insulator 200. The upper plate 210 and the lower plate 220 may be coupled by fastening the fastening bolts 240 to the bolt fastening holes formed in the upper plate 210 and the lower plate 220.

Specifically, the fastening bolts 240 may be mounted to the upper plate 210 and the lower plate 220 from the lower side of the lower plate 220 so as to protrude upward from the upper plate 210. The fastening bolts 240 may perform a function of coupling the upper plate 210 and the lower plate 220 of the insulator 200 as well as a function of fixing the top mount assembly 100 to the vehicle body. For example, the top mount assembly 100 may be fixed to the vehicle body by fastening nuts (not illustrated) to the fastening bolts 240 in the state in which the fastening bolts 240 are coupled to the vehicle body so as to protrude upward from the vehicle body.

According to an embodiment of the present disclosure, the strut bearing 300 may be provided below the insulator 200. The strut bearing 300 may comprise the upper housing 310, a lower housing 320, a bearing 330 interposed between the upper housing 310 and the lower housing 320, and the like, and may be configured such that the upper housing 310 and the lower housing 320 are rotated relative to each other by the bearing 330.

According to an embodiment of the present disclosure, the upper housing 310 of the strut bearing 300 may be configured to be coupled integrally with the insulator 200 below the insulator 200. Specifically, the upper housing 310 may be formed to be coupled integrally with the lower plate 220 of the insulator 200 by insert injection molding. In this case, the upper housing 310 may be configured to enclose the fastening bolts 240 (for example, head portions of the fastening bolts 240 in the case of the embodiments illustrated in FIGS. 3 and 4) protruding downward of the lower plate 220 to further enhance a coupling force between the insulator 200 and the upper housing 310.

As described above, the top mount assembly 100 according to an embodiment of the present disclosure is configured such that the upper housing 310 constituting the strut bearing 300 is formed to be coupled integrally with the lower plate 220 constituting the insulator 200. This makes it possible to prevent foreign matters from entering between the upper housing 310 and the lower plate 220 in a stable manner, and prevent the upper housing 310 from being spaced apart from the lower plate 220 or prevent the upper housing 310 or the lower plate 220 from being damaged due to the foreign matters entering between the upper housing 310 and the lower plate 220.

According to an embodiment of the present disclosure, the upper housing 310 of the strut bearing 300 may be formed below the insulator 200 by insert injection molding or the like in the state in which the insulator 200 is formed to have the rubber bushing 230 interposed between the upper plate 210 and the lower plate 220. For example, the upper housing 310 of the strut bearing 300 may be formed to be coupled integrally with the insulator 200 by an insert injection molding of disposing into and fixing to the assembled insulator 200 in a mold and then injecting molten plastic used as a material of the upper housing 310 into the mold.

According to an embodiment of the present disclosure, the upper housing 310 of the strut bearing 300 may be configured to comprise an insulator mounting part 311 on which the insulator 200 described above is mounted and a body part 312 provided on around the insulator mounting part 311.

According to an embodiment of the present disclosure, the insulator mounting part 311 may be formed in a shape corresponding to the upper and lower plates of the insulator 200 so that the insulator 200 can be mounted on the insulator mounting part 311. The insulator mounting part 311 may comprise a lower plate mounting part 311a on which a lower surface of the lower plate 220 is mounted and an upper plate supporting part 311b formed around the lower plate mounting part 311a.

According to an embodiment of the present disclosure, the lower plate mounting part 311a of the insulator mounting part 311 may have an opened central portion into which the protruded central portion (the portion in which the second bushing accommodation part 222 is formed) of the lower plate 210 is inserted. A mounting surface on which the lower surface of the lower plate 220 is to be mounted is provided around the penetrated central portion to support the lower surface of the lower plate 220.

Further, the coupling flange 313 is provided on the upper portion of the insulator mounting part 311 (specifically, the upper portion of the lower plate mounting part 311a) to be received within the holding parts 228 of the lower plate 220. Thus, the coupling force between the lower plate 220 of the insulator 200 and the upper housing 310 of the strut bearing 300 can be further enhanced.

Specifically, the coupling flange 313 may be formed by injecting the molten plastic used as a material of the upper housing 310 into the accommodation recesses 228b via the through-holes 228a of the holding parts 228 when forming the upper housing 310 of the strut bearing 300 below the insulator 200 by insert injection molding or the like. By the coupling flange 313, the upper housing 310 of the strut bearing 300 can be more firmly coupled to the lower plate 220 of the insulator 200. This makes it possible to more effectively prevent the upper housing 310 from being spaced apart from or separated from the insulator 200.

According to an embodiment of the present disclosure, the insulator mounting part 311 formed in the upper housing 310 may further comprise an upper plate supporting part 311b that supports the lower surface of the upper plate 210 outside the lower plate mounting part 311a.

According to an embodiment of the present disclosure, the upper plate supporting part 311b may have an upper surface formed in a shape corresponding to the lower surface of the upper plate 210 to support the lower surface of the upper plate 210 protruding more outward than the lower plate 220. The upper plate supporting part 311b may be formed to entirely or partially support the lower surface of the upper plate 210 protruding more outward than the lower plate 220. More preferably, in order to support the lower surface of the upper plate 210 in a more stable manner, the upper plate supporting part 311b may be formed to support the entire lower surface of the upper plate 210 protruding more outward than the lower plate 220 through the upper plate supporting part 311b (see FIGS. 1 to 5). For example, an outer peripheral surface of the upper plate supporting part 311b may be formed to be equal in size to the outer peripheral surface of the upper plate 210, or to be larger than the outer peripheral surface of the upper plate 210. Thus, the upper plate 210 can be supported by the upper plate supporting part 311b without protruding more outward than the upper plate supporting part 311b.

With this configuration, both the lower plate 220 and the upper plate 210 of the insulator 200 are configured to be supported by the insulator mounting part 311 formed in the upper housing 310 of the strut bearing 300. This makes it possible to form the top mount assembly in a more stable structure at high rigidity.

According to an embodiment of the present disclosure, the upper housing 310 may be configured to comprise a body part 312 (rib part) having one or more ribs 312a around the insulator mounting part 311. By providing the body part 312 having the one or more ribs 312a in the upper housing 310, it is possible to prevent the upper surface of the upper housing 310 from shrinking or being deformed when the molten plastic is solidified in the course of forming the upper housing 310 by insert injection molding, thus forming the upper housing 310 having a more uniform structure and high rigidity.

According to an embodiment of the present disclosure, the one or more ribs 312a provided in the body part 312 (rib part) may be formed to extend radially from the center of the upper housing 310. A plurality of ribs 312a may be formed in the body part 312 at predetermined intervals along the circumferential direction. By forming the plurality of ribs 312a in the body part 312 along the circumferential direction as described above, the upper housing 310 can be uniformly contracted or deformed along the circumferential direction when the molten plastic is solidified in the course of forming the upper housing 310 by insert injection molding. Thus, the upper housing 310 can have a uniform shape and rigidity along the circumferential direction.

Figure 8:
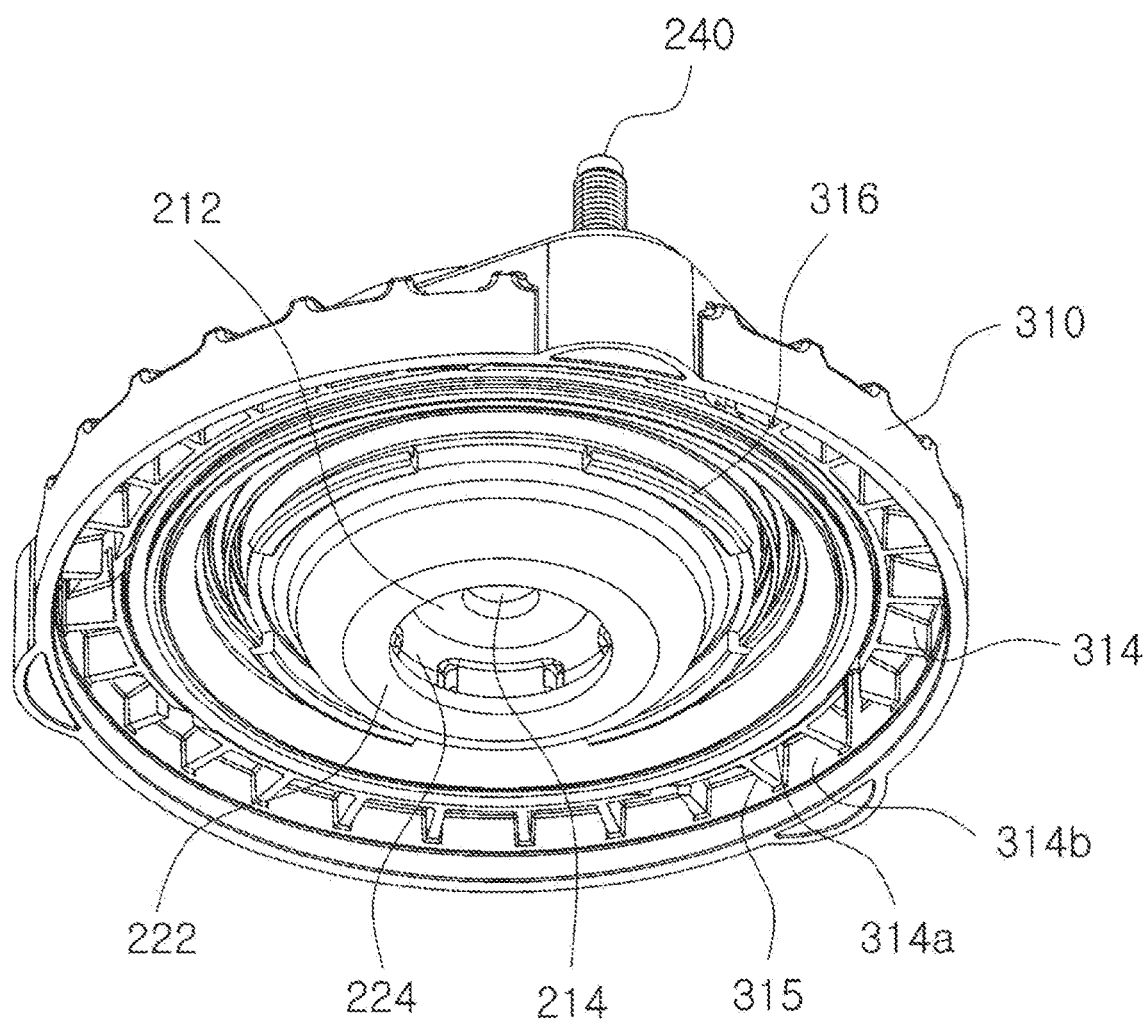
FIG. 8 exemplarily illustrates a lower structure in which the upper housing of the strut bearing is formed integrally with the insulator according to an embodiment of the present disclosure.

According to an embodiment of the present disclosure, the lower surface of the upper housing 310 may be formed in an upwardly-depressed shape such that the lower housing 320 and the bearing 330 of the strut bearing 300 can be coupled (see FIG. 8).

According to an embodiment of the present disclosure, the lower surface of the upper housing 310 may have a recess part 314 that has an upwardly-depressed shape and is formed close to the outer periphery. Such a recess part 314 may function as a material reduction part of an injection-molded material forming the upper housing 310, thus preventing a problem from occurring in dimensional stability of the upper housing 310 by twisting due to shrinkage of the injection-molded material having a thick structure.

According to an embodiment of the present disclosure, the recess part 314 provided in the lower surface of the upper housing 310 may be formed to extend along the circumferential direction. One or more reinforcing ribs 315 may be formed to extend between a radial inner surface 314a and a radial outer surface 314b of the recess part 314 along the circumferential direction, which makes it possible to prevent a degradation in rigidity due to the formation of the recess part 314 (material reduction part).

According to an embodiment of the present disclosure, the upper housing 310 may comprise an upper hook 316 that is used when coupling the upper housing 310 and the lower housing 320 (see FIG. 5). The upper hook 316 may be formed to protrude in the radially outward direction from an opened cylindrical part formed in the central portion of the upper housing 310. The upper hook 316 may be formed continuously along the circumferential direction of the upper housing 310. Alternatively, as illustrated in FIG. 8, a plurality of upper hooks 316 may be formed to be spaced apart from each other along the circumferential direction of the upper housing 310.

According to an embodiment of the present disclosure, the lower housing 320 may be coupled to the lower side of the upper housing 310. As illustrated in FIGS. 4 and 5, the lower housing 320 may comprise a lower hook 322 to be coupled to the upper hook 316 of the upper housing 310. The lower hook 322 may be formed to protrude in the radially inward direction from the inner peripheral surface of the lower housing 320. The lower hook 322 may be formed continuously along the circumferential direction of the lower housing 320. Alternatively, a plurality of lower hooks may be formed to be spaced apart from each other along the circumferential direction of the lower housing 320.

According to an embodiment of the present disclosure, the upper hook 316 formed in the upper housing 310 may be coupled to the lower hook 322 formed in the lower housing 320 in a snap-fitting manner.

Figure 9:
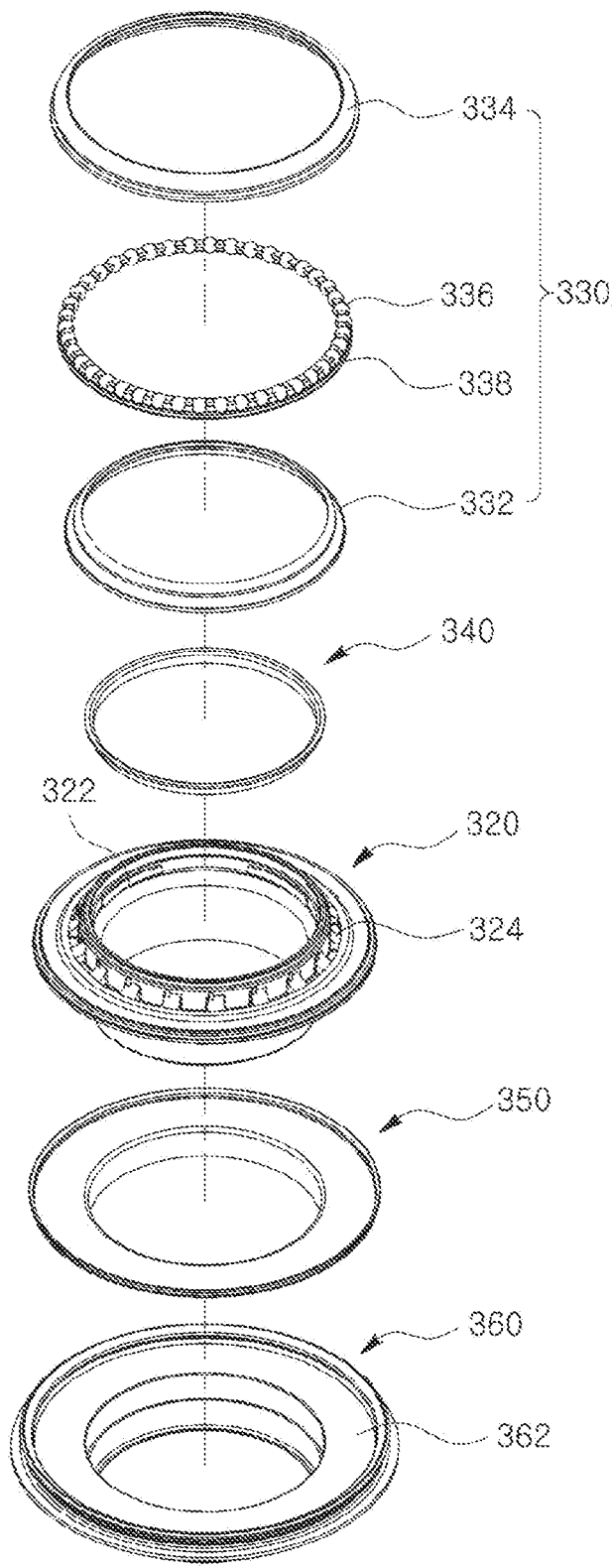
FIG. 9 exemplarily illustrates an exploded perspective view of a lower housing of the strut bearing, a bearing, a spring pad frame and a spring pad, which are provided in the top mount assembly according to an embodiment of the present disclosure.

According to an embodiment of the present disclosure, the lower housing 320 may comprise a bearing seat 324 for supporting the bearing 330 from below (see FIG. 9).

According to an embodiment of the present disclosure, the bearing 330 is interposed between the upper housing 310 and the lower housing 320 of the strut bearing 300 such that the upper housing 310 and the lower housing 320 can be coupled to each other while rotating relative to each other through the bearing 330. According to an embodiment of the present disclosure, the bearing 330 may comprise an inner ring 332, an outer ring 334, and one or more rolling elements 336 provided between the inner ring 332 and the outer ring 334. The rolling elements 336 provided between the inner ring 332 and the outer ring 334 may be held while being spaced apart from each other by a retainer 338.

According to an embodiment of the present disclosure, the inner ring 332 of the bearing 330 may be placed and mounted on the bearing seat 324 of the lower housing 320. The outer ring 334 may be configured such that an upper portion of the outer ring 334 is in contact with one side of the upper housing 310 while being spaced apart from the inner ring 332.

Figure 10:
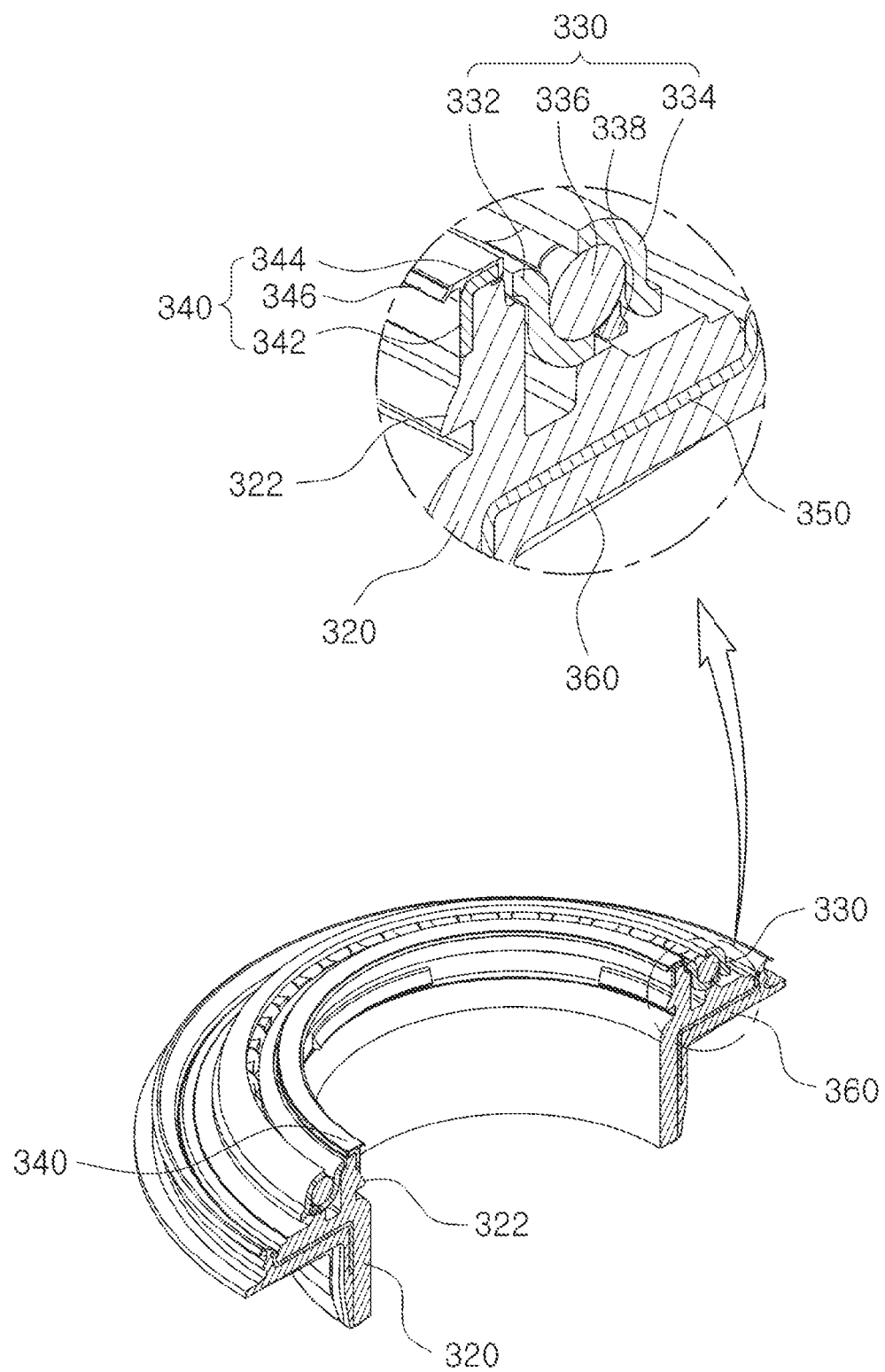
FIG. 10 exemplarily illustrates a cross-sectional structure in which constituent elements illustrated in FIG. 9 are coupled to each other.

According to an embodiment of the present disclosure, the top mount assembly 100 may further comprise an inner sealing member 340 provided in a radially inward portion of the bearing 330. As illustrated in FIGS. 5 and 10, the inner sealing member 340 may comprise a frame part 342 to be mounted on one side of the lower housing 320 and an elastic sealing part 344 to be coupled to the frame part 342.

According to an embodiment of the present disclosure, the frame part 342, which is a body of the inner sealing member 340, may be mounted on one side of the lower housing 320 in a press-fitting manner. For example, in the case of the embodiments illustrated in the drawings, the frame part 342 may be formed of a ring-shaped member having an L-shaped cross-sectional structure, and may be mounted on a protruded portion formed inside the lower housing 320 in a press-fitting manner. However, the frame part 342 is not necessarily formed in the structure illustrated in the drawings, but may be formed in various other shapes.

Further, the elastic sealing part 344, which is a part configured to perform sealing between the upper housing 310 and the lower housing 320 that rotate relative to each other, may be formed of an elastic material such as rubber by sulfurizing mold. The elastic sealing part 344 may have a sealing lip 346 formed to extend from the frame part 342 toward the upper housing 310. One end of the sealing lip 346 may be disposed to be in contact with or adjacent to one side of the upper housing 310 to perform sealing. For example, in the case of the embodiments illustrated in the drawings, the inner sealing member 340 is configured such that the sealing lip 346 of the inner sealing member 340 is brought into contact with a sealing groove 317 formed in the upper housing 310 to perform sealing in a contact manner (see FIG. 5).

According to an embodiment of the present disclosure, the top mount assembly 100 may further comprise a spring pad frame 350 to be coupled integrally with the lower housing 320. The spring pad frame 350 may be disposed on the outer peripheral surface of the lower housing 320 to perform a function of reinforcing the rigidity of the lower housing 320 and indirectly supporting an upper end of the spring 430 disposed on the lower side. The spring pad frame 350 may be formed of a metal plate material. The spring pad frame 350 may be formed integrally with the lower housing 320 by injecting molten plastic into a mold and injection-molding the lower housing 320 in a state in which the spring pad frame 350 is fixed to the mold at the time of forming the lower housing 320.

According to an embodiment of the present disclosure, the top mount assembly 100 may further comprise a spring pad 360 provided outside of the spring pad frame 350 to be coupled integrally with the spring pad frame 350. At least a portion of the spring pad 360 may be arranged between the upper housing 310 and the lower housing 320 at a radially outward portion of the bearing 330. Thus, the spring pad 360 can perform a function of sealing between the upper housing 310 and the lower housing 320 from the outside.

According to an embodiment of the present disclosure, the spring pad 360 may comprise a seat part 362 and an outer sealing lip 364 provided outside the seat part 362. The seat part 362 and the outer sealing lip 364 may be formed by sulfurize-molding rubber material. The seat part 362 may be formed to extend in the radially outward direction. An upper end of the spring 430 may be positioned on an outer side or outer peripheral surface of the seat part 362. The seat part 362 may perform a function of preventing the occurrence of noise due to friction between the lower housing 320 (or the spring pad frame 350) and the spring 430, and suppressing impact or vibration from being transferred from the spring 430 to the lower housing 320 (or the spring pad frame 350). One end of the outer sealing lip 364 may be disposed to be in contact with or adjacent to one side of the upper housing 310. Thus, the outer sealing lip 364 may seal between the upper housing 310 and the lower housing 320 in the radially outward direction of the bearing 330.

Figure 11:
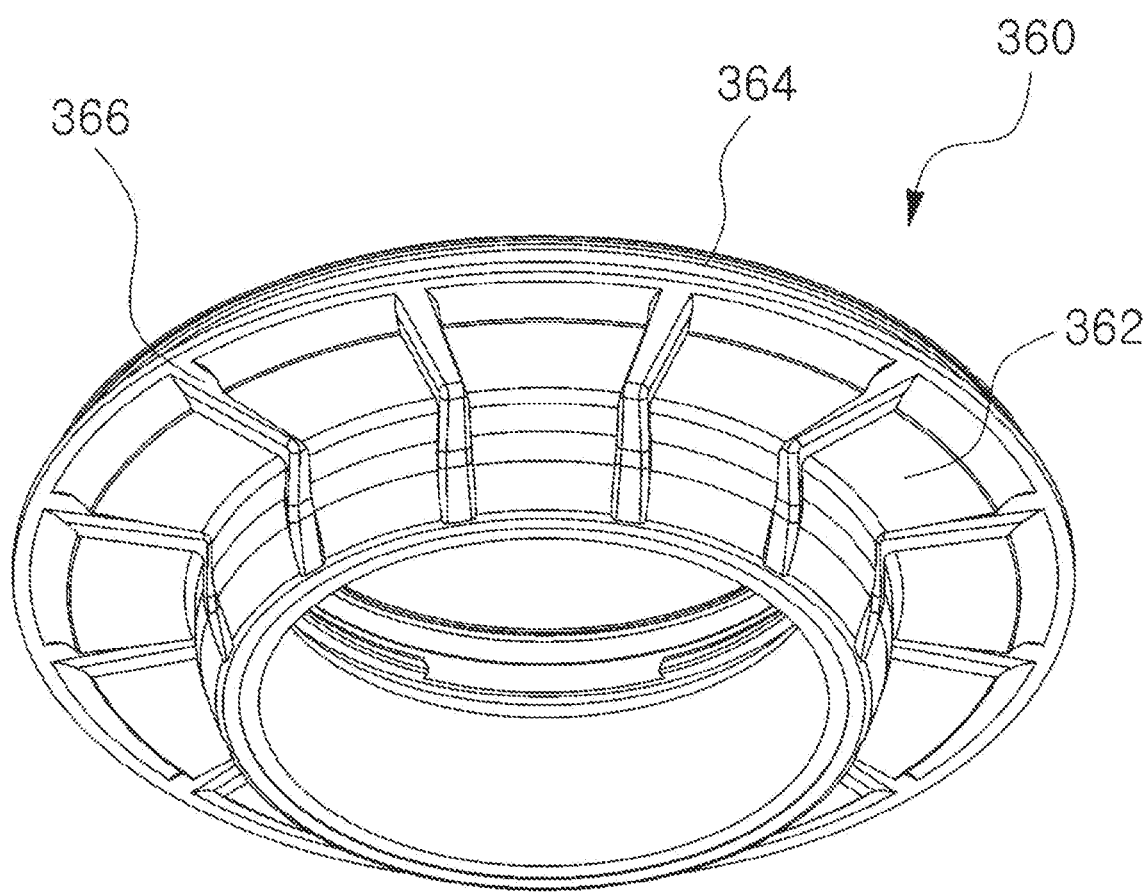
FIG. 11 exemplarily illustrates a lower structure in which the constituent elements illustrated in FIG. 9 are coupled to each other.

According to an embodiment of the present disclosure, a lower surface of the seat part 362 may be provided with a plurality of slots 366 arranged to be spaced apart from each other along the circumferential direction (see FIG. 11). By forming the plurality of slots 366 in the seat part 362 in this manner, the lower surface of the seat part 362 may be expanded or deformed between the plurality of slots 366 along the circumferential direction even if impact is applied from the spring 430 to the seat part 362. Thus, the seat part 362 can absorb such impact in a more efficient manner.

Method of Manufacturing Top Mount Assembly According to an Embodiment of Present Disclosure Next, a method of manufacturing the top mount assembly 100 according to an embodiment of the present disclosure described above will be exemplarily described with reference to a flowchart illustrated in FIG. 12 (specific configurations and functions of the top mount assembly 100 have been described in detail in the above embodiments described with reference to FIGS. 1 to 11, and thus detailed descriptions thereof will be omitted herein).

Although operations in the flowchart illustrated in FIG. 12 and procedures described below have been described in a sequential order, these operations and procedures may not be necessarily performed in the sequence described below. For example, the order of some operations and procedures may be changed, or some of the operations and procedures may be performed in a simultaneous manner.

Figure 12:
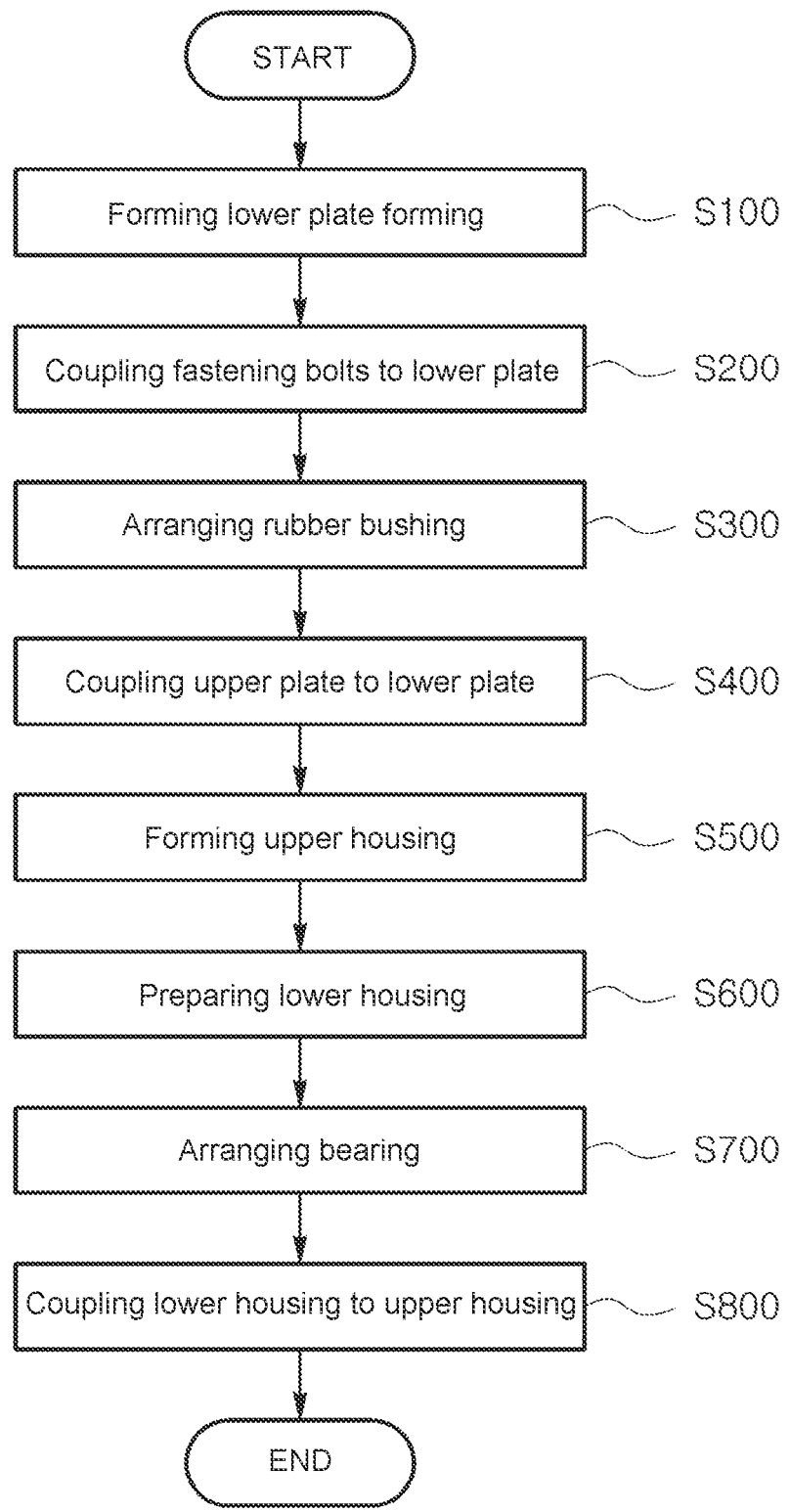
FIG. 12 exemplarily illustrates a flowchart for explaining a method of manufacturing the top mount assembly according to an embodiment of the present disclosure.

As illustrated in FIG. 12, the top mount assembly manufacturing method according to an embodiment of the present disclosure may comprise: a lower plate forming operation S100 of forming the lower plate 220 of the insulator 200; a fastening-bolt coupling operation S200 of coupling at least one fastening bolt 240 to the lower plate 220; a rubber bushing arrangement operation S300 of arranging the rubber bushing 230 on the lower plate 220; an upper plate coupling operation S400 of coupling the upper plate 210 to the lower plate 220 and the fastening bolts 240 coupled to the lower plate 220; an upper housing forming operation S500 of forming the upper housing 310 of the strut bearing 300 below the insulator 200; a lower housing preparation operation S600 of forming and preparing the lower housing 320 of the strut bearing 300; a bearing arrangement operation S700 of arranging the bearing 330 on the lower housing 320 of the strut bearing 300; and an upper-housing and lower-housing coupling operation S800 of coupling the lower housing 320 to the upper housing 310 of the strut bearing 300 in a state in which the bearing 330 interposed between the upper housing 310 and the lower housing 320.

According to an embodiment of the present disclosure, in the lower plate forming operation S100, the lower plate 220 may be formed by pressing or punching a metal plate. The lower plate 220 may be formed to at least one holding part 228 having the through-holes 228a and the accommodation recesses 228b.

According to an embodiment of the present disclosure, in the fastening-bolt coupling operation S200, the fastening bolts 240 may be inserted into and coupled to the bolt fastening holes (the second bolt fastening holes 226) formed in the lower plate 220 from the lower side of the lower plate 220. The fastening bolts 240 may be mounted to the respective bolt fastening holes (the second bolt fastening holes 226) in a press-fitting manner.

According to an embodiment of the present disclosure, in the rubber bushing arrangement operation S300, the rubber bushing 230 is arranged on the lower plate 220 such that the lower protrusions 234 formed in the lower portion of the rubber bushing 230 are accommodated in the bushing accommodation groove formed in the lower plate 220 (the second bushing accommodation part 222).

According to an embodiment of the present disclosure, in the upper plate coupling operation S400, the upper plate 210 is coupled to the lower plate 220 from above such that the fastening bolts 240 are mounted to the respective bolt fastening holes (the first bolt fastening holes 216) formed in the upper plate 210 in a press-fitting manner. For example, the upper plate 210 may be coupled, from above downward, to the lower plate 210 to which the fastening bolts 240 are mounted in a press-fitting manner. The fastening bolts 240 may be mounted to the bolt fastening holes (the first bolt fastening holes 216) in a press-fitting manner.

Through the processes as described above, the upper plate 210 and the lower plate 220 are coupled to each other in a state in which the rubber bushing 230 is interposed therebetween to form the insulator 200 of the top mount assembly 100. After the insulator 200 is formed as described above, the strut bearing 300 is formed and mounted on the lower portion of the insulator 200 through processes to be described below, and thus the top mount assembly 100 is manufactured.

According to an embodiment of the present disclosure, in the upper housing forming operation S500, the upper housing 310 of the strut bearing 300 is formed integrally on the lower portion of the insulator 200 by injecting molten plastic into a mold in a state in which the insulator 200 formed through the above-described processes is arranged in the mold. In this case, the upper housing 310 may be formed to directly support both the lower plate 220 and the upper plate 210 of the insulator 200 from below (for example, to directly support the lower surface of the upper plate 210 protruding more outward than the lower plate 220). The coupling flange 313 may be formed by allowing the molten plastic to flow into the holding part 228 formed in the lower plate 220 of the insulator 200. Specifically, the upper housing 310 may comprise the insulator mounting part 311 provided at the upper portion thereof and on which the insulator 200 is mounted. The insulator mounting part 311 may comprise the lower plate mounting part 311a on which the lower plate 220 of the insulator 200 is mounted, and the upper plate supporting part 311b formed outside the lower plate mounting part 311a. The upper plate supporting part 311b may be configured to support the lower surface of the upper plate 210 protruding more outward than the lower plate 220 from below.

According to an embodiment of the present disclosure, in the lower housing preparation operation S600, the lower housing 320 to be coupled to the upper housing 310 may be formed.

According to an embodiment of the present disclosure, in the bearing arrangement operation S700, the bearing 330 may be arranged on the lower housing 320 (for example, on the bearing seat 324 of the lower housing 320).

According to an embodiment of the present disclosure, in the upper-housing and lower-housing coupling operation S800, the upper housing 310 and the lower housing 320 of the strut bearing 300 are coupled to each other with the bearing 330 interposed therebetween. In this case, the coupling of the upper housing 310 and the lower housing 320 may be performed by coupling between the upper hook 316 formed in the upper housing 310 and the lower hook 322 formed in the lower housing 320 in a snap-fitting manner.

Although the present disclosure has been described above in terms of specific items such as detailed constituent elements as well as the limited embodiments and the drawings, they are merely provided to help more general understanding of the present disclosure, and the present disclosure is not limited to the above embodiments. Various modifications and changes could have been realized by those skilled in the art to which the present disclosure pertains from the above description.

Therefore, the spirit of the present disclosure need not to be limited to the above-described embodiments, and in addition to the appended claims to be described below, and all ranges equivalent to or changed from these claims need to be the to belong to the scope and spirit of the present disclosure.

What is claimed is:

1. A top mount assembly for a vehicle, the top mount assembly comprising:
   an insulator comprising an upper plate, a lower plate, and a rubber bushing accommodated in an accommodation space defined between the upper plate and the lower plate; and
   a strut bearing comprising an upper housing, a lower housing, and a bearing interposed between the upper housing and the lower housing and configured to rotate the lower housing relative to the upper housing,
   wherein the upper housing of the strut bearing comprises an insulator mounting part formed an upper portion of the upper housing and on which the insulator is mounted,
   the insulator mounting part comprises a lower plate mounting part on which the lower plate of the insulator is mounted, and an upper plate supporting part formed outside the lower plate mounting part, and
   the upper plate supporting part is configured to support a lower surface of the upper plate, which protrude more outward than the lower plate, from below.

2. The top mount assembly of claim 1, wherein an outer peripheral surface of the upper plate supporting part is formed to be equal in size to an outer peripheral surface of the upper plate, or to be larger than the outer peripheral surface of the upper plate, so that the outer peripheral surface of the upper plate is formed so as not to protrude more outward than the upper plate supporting part.

3. The top mount assembly of claim 2, wherein the lower plate of the insulator comprises at least one holding part used for coupling with the upper housing of the strut bearing.

4. The top mount assembly of claim 3, wherein the holding part comprises a through-hole formed to penetrate the lower plate and an accommodation recess formed in an upper portion of the through-hole and having a size larger than the through-hole.

5. The top mount assembly of claim 4, wherein the insulator mounting part further comprises a coupling flange formed and accommodated in the accommodation recess of the holding part.

6. The top mount assembly of claim 5, wherein the upper housing of the strut bearing is formed by an insert injection molding in a state in which the upper plate and the lower plate of the insulator are coupled such that a rubber bushing is accommodated between the upper plate and the lower plate of the insulator, so that the upper housing of the strut bearing is coupled integrally with the lower plate of the insulator.

7. The top mount assembly of claim 6, wherein the upper plate and the lower plate of the insulator are coupled to each other by mounting one or more fastening bolts into bolt fastening holes, respectively, and the fastening bolts are mounted into the bolt fastening holes formed in the lower plate and the upper plate from a lower side of the lower plate in a press-fitting manner.

8. The top mount assembly of claim 7, wherein the upper housing of the strut bearing is formed to enclose the fastening bolts protruding toward the lower side of the lower plate.

9. The top mount assembly of claim 6, wherein the upper housing of the strut bearing further comprises a body part having a plurality of ribs formed to extend radially on one side of the insulator mounting part.

10. The top mount assembly of claim 7, wherein a lower surface of the upper housing comprises a recess part having an upwardly-depressed structure.

11. A top mount assembly for a vehicle, the top mount assembly comprising:
    an insulator comprising an upper plate, a lower plate, and a rubber bushing accommodated in an accommodation space defined between the upper plate and the lower plate; and
    a strut bearing comprising an upper housing, a lower housing, and a bearing interposed between the upper housing and the lower housing and configured to rotate the lower housing relative to the upper housing,
    wherein the upper housing of the strut bearing comprises an insulator mounting part formed on an upper portion of the upper housing and on which the insulator is mounted,
    a lower surface of the upper housing comprises a recess part having an upwardly-depressed structure, and
    the recess part is provided at a radially outward portion of the bearing, and
    wherein the recess part formed on the lower surface of the upper housing comprises one or more reinforcing ribs formed to extend between a radial inner surface and a radial outer surface of the recess part along a circumferential direction.

* * * * *